(12) United States Patent
Rosskamp (10) Patent No.: US 9,943,039 B2
(45) Date of Patent: Apr. 17, 2018

(54) OUTDOOR POWER TOOL

(71) Applicant: Andreas Stihl AG & Co KG, Baden-Württemberg (DE)

(72) Inventor: Heiko Rosskamp, Adelberg (DE)

(73) Assignee: Andreas Stihl AG & Co KG (DE)

( * ) Notice: Subject to any disclaimer, the term of this patent is extended or adjusted under 35 U.S.C. 154(b) by 0 days.

(21) Appl. No.: 15/410,685

(22) Filed: Jan. 19, 2017

(65) Prior Publication Data

US 2017/0127619 A1    May 11, 2017

Related U.S. Application Data

(63) Continuation of application No. 13/100,067, filed on May 3, 2011, now Pat. No. 9,572,302, which is a continuation of application No. 11/786,144, filed on Apr. 10, 2007, now Pat. No. 7,958,642.

(30) Foreign Application Priority Data

Apr. 10, 2006   (DE) ........................ 10 2006 018 072

(51) Int. Cl.
*B23D 49/00*  (2006.01)
*A01G 3/053*  (2006.01)

(52) U.S. Cl.
CPC .................. *A01G 3/053* (2013.01)

(58) Field of Classification Search
CPC .................................................. A01G 3/053
USPC ......... 30/277.4, 392.228, 216, 50, 392, 131, 30/501, 215; 310/47
See application file for complete search history.

(56) References Cited

U.S. PATENT DOCUMENTS

| 3,212,938 A | 10/1965 | Neuhardt et al. |
| 3,623,223 A | 11/1971 | Edgell et al. |
| 3,757,194 A * | 9/1973 | Weber .................... A01G 3/053 15/DIG. 1 |
| 3,932,015 A | 1/1976 | Ware et al. |
| 3,934,340 A | 1/1976 | Jones et al. |
| 3,959,879 A | 6/1976 | Sellers |
| 4,370,810 A | 2/1983 | Schurr et al. |

(Continued)

FOREIGN PATENT DOCUMENTS

| CA | 2004923 | 12/1989 |
| CA | 2549984 A1 * | 12/2006 ............. A01G 3/053 |

(Continued)

OTHER PUBLICATIONS

Birmingham Post, "Article: Gardening Club; Trim your hedges in comfort and safety," Printed in Birmingham Post (England), dated Sep. 8, 2011, 5 pages.

(Continued)

*Primary Examiner* — Omar Flores Sanchez
(74) *Attorney, Agent, or Firm* — Klarquist Sparkman, LLP (57) ABSTRACT

A cutting tool has a housing. A blade bar projects forwards from the housing along a longitudinal axis. An electric drive motor drives the blade bar. At least one battery supplies the drive motor with electrical energy. The blade bar, the drive motor and the battery are mounted on the housing. The cutting tool has a top handle arranged above a center of gravity of the hedge trimmer, and a rear handle arranged behind the hedge-trimmer center of gravity. The battery is arranged on the housing at least mainly in front of the rear handle.

33 Claims, 3 Drawing Sheets

(56) References Cited

U.S. PATENT DOCUMENTS

| | | |
|---|---|---|
| 5,065,476 A | 11/1991 | Dohse et al. |
| 5,140,249 A | 8/1992 | Linder et al. |
| 5,150,523 A | 9/1992 | McCurry |
| 5,208,525 A | 5/1993 | Lopic et al. |
| 5,589,288 A | 12/1996 | Coulson et al. |
| 5,697,258 A | 12/1997 | Aiyama |
| 5,881,823 A | 3/1999 | Kabatnik et al. |
| 6,181,032 B1 | 1/2001 | Marshall et al. |
| 6,286,611 B1 | 9/2001 | Bone |
| 6,301,788 B1 | 10/2001 | Webster |
| 6,701,622 B2 | 3/2004 | Covell et al. |
| 6,775,913 B2 | 8/2004 | Fey et al. |
| 6,820,338 B2 | 11/2004 | Lin |
| 7,484,300 B2 | 2/2009 | King et al. |
| 8,136,257 B2 | 3/2012 | Lau |
| 2007/0000138 A1 | 1/2007 | Baskar et al. |
| 2008/0211327 A1 | 9/2008 | Schlegel et al. |

FOREIGN PATENT DOCUMENTS

| | | | |
|---|---|---|---|
| DE | 1 223 443 | 3/1967 | |
| DE | 2 332 630 | 1/1974 | |
| DE | 40 21 277 | 3/1991 | |
| DE | 43 32 986 | 3/1995 | |
| DE | 195 21 423 | 12/1996 | |
| DE | 199 26 375 | 12/2000 | |
| DE | 10 2004 036 588 | 7/2004 | |
| DE | 20 2004 015 480 | 12/2004 | |
| EP | 0 374 600 | 12/1989 | |
| EP | 0 374 600 | 8/1995 | |
| EP | 0 599 550 | 2/1997 | |
| EP | 1 059 025 | 4/2000 | |
| EP | 2223780 A2 * | 9/2010 | ............ A01G 3/053 |
| JP | 53-75053 | 7/1978 | |
| JP | 62-115212 | 5/1987 | |
| JP | 63-129933 | 6/1988 | |
| JP | 2002-291338 | 10/2002 | |
| JP | 2003-250340 | 9/2003 | |
| JP | 2005-13 7329 | 6/2005 | |
| WO | WO 95/09072 | 4/1995 | |
| WO | WO 2006/010676 | 2/2006 | |

OTHER PUBLICATIONS

Bosch Corporation, Exploded drawing of "Bosch AHS 3" dated May 31, 1999, 2 pages.
Bosch Corporation, Instruction manual for "Bosch AHS 3/4 Accu" with English language translation, dated Aug. 1, 2001, German with English translation, 15 pages.
Commercial website amazon.de "Bosch Heckenschere AHS 3 Akku", dated Jan. 26, 2004, last accessed Jun. 28, 2010, 2 pages.
European Search Report for EP 07 00 6791 (dated May 6, 2008).

* cited by examiner

OUTDOOR POWER TOOL

CROSS-REFERENCE TO RELATED APPLICATIONS

This is a continuation of U.S. patent application Ser. No. 13/100,067, filed May 3, 2011, which claims the benefit of U.S. patent application Ser. No. 11/786,144, filed Apr. 10, 2007, which claims the benefit of German Patent Application No. DE 10 2006 018 072.0, filed Apr. 10, 2006; each of which is hereby incorporated by reference herein in its entirety.

BACKGROUND

The present invention relates to a hedge trimmer having a housing, on which a blade bar projects forward from the housing along a longitudinal axis, an electric drive motor for driving the blade bar and at least one electric energy store for supplying the drive motor with electrical energy are mounted, having a top handle arranged above a center of gravity of the hedge trimmer, and having a rear handle arranged behind the hedge-trimmer center of gravity.

Hedge trimmers serve to trim hedges or to cut back bushes or strong stalky plants. Motor-operated hedge trimmers are driven either by an internal combustion engine or by an electric motor. Hedge trimmers driven by electric motor have hitherto normally been mains-operated, and therefore the electrical energy is fed via a cable. This restricts the handling of such hedge trimmers and in addition involves a safety risk, since the cable can be severed inadvertently.

Hedge trimmers having an electric-motor drive and an electric energy store mounted on the housing of the hedge trimmer have likewise been known for years. This type of hedge trimmer has hitherto been problematic with regard to overall weight, with regard to the working time available with one charge, and with regard to handling.

For this reason, such hedge trimmers have hitherto only been used in the hobby sector. In recent years, however, the energy density of available electric energy stores has greatly increased, in particular in the case of lithium-based batteries. For this reason, the aim is also to use hedge trimmers of the generic type in the "professional sector".

DE-C 1 223 443 discloses a hedge trimmer in which a rear part of the housing is designed as a handle which accommodates an interchangeable battery set.

EP 0 599 550 P1 likewise discloses a hedge trimmer of the generic type in which a safety locking mechanism is implemented.

EP 0 374 600 B1 discloses a hedge trimmer driven by a battery that is located beneath the rear handle.

A common feature of these implements, as well as of the implements from the "hobby sector" which are otherwise available on the market, is that the battery is arranged on a rear or bottom section of the housing.

Further, DE 199 26 375 A1 discloses a mains-independent hedge trimmer, the rear handle thereof being pivotably mounted on the housing.

BRIEF SUMMARY

Against the above background, it would be desirable to provide a hedge trimmer of the generic type which offers ease of handling.

Described below is a hedge trimmer that, in one implementation, has an energy store or battery arranged on the housing at least mainly in front of the rear handle.

This design ensures that the hedge trimmer has good "balance" overall. Therefore fatigue-free operation even for a prolonged period is possible.

In addition, the rear handle can be configured or designed in any desired manner within wide limits.

In this connection it should be noted that, within the scope of the present application, a longitudinal direction is generally a direction parallel to the longitudinal axis of the blade bar. A lateral direction is a direction transversely, in particular approximately at right angles, to the longitudinal direction, and to be precise, approximately in the horizontal direction. A height direction is likewise a direction approximately at right angles to the longitudinal direction, and to be precise, approximately in the vertical direction.

The expressions "front" and "rear" generally relate to the longitudinal direction, "front" being where the blade bar is. The expressions "above" and "below" relate to the height direction.

These specifications of location, however, are only intended to serve for simplified description of the relative position of the components of the hedge trimmer according to the invention, to be precise in a normal horizontal working position of the hedge trimmer. In addition, however, the expressions are not to be understood restrictively.

The energy store is preferably arranged on the housing in front of the drive motor as viewed in the longitudinal direction.

This configuration enables a very good distribution of weight or very good balance to be achieved overall.

For effective arrangement of the blade bar on the housing, a coupling between the blade bar and the electric drive motor inside the housing is often shifted rearwards as viewed in the longitudinal direction. Therefore, in the arrangement of the energy store in front of the drive motor, the available construction space is also readily utilized.

According to a further preferred embodiment, the energy store is arranged on the housing in an overlapping manner with the drive motor as viewed in the height direction. Here, too, good balance is achieved.

The energy store is preferably arranged on the housing at least partly above the drive motor. This permits possibly easier interchangeability of the energy store.

As an alternative to this, it is possible to arrange the energy store on the housing at least partly below the drive motor.

According to a further preferred embodiment, the energy store is arranged on the housing at least partly in an overlapping manner with the drive motor as viewed in the lateral direction.

Here, too, it is possible to achieve a good distribution of weight and thus good "balance." Furthermore, it is possible for the housing to be of compact design in the height direction.

It is especially advantageous in this case if the energy store is arranged on the housing laterally next to the drive motor.

According to a further preferred embodiment, the energy store is arranged on the housing behind the drive motor as viewed in the longitudinal direction.

Here, too, a good distribution of the weight can be realized.

Furthermore, it is advantageous overall if the energy store has two sections which are arranged approximately symmetrically with respect to the drive motor.

In this embodiment, the energy store can certainly consist of one piece but can have two sections, such as legs for example, which extend approximately symmetrically with respect to the drive motor. However, it is also possible to mount two energy stores on the housing, these energy stores being separate from one another and being arranged symmetrically with regard to the drive motor.

The symmetry in this case may relate to the height direction. However, in order to achieve a type of construction that is compact in the height direction, it is especially preferred if the two sections are arranged laterally next to the drive motor.

It is generally also possible for the two sections not to be arranged symmetrically relative to the drive motor.

According to a further embodiment preferred overall, the energy store is arranged on the housing obliquely with respect to the longitudinal axis.

In this embodiment, a type of construction that is compact in the height direction can likewise be achieved.

It is also especially advantageous for the same reason if the drive motor has a motor shaft which is arranged obliquely with respect to the longitudinal axis.

In the present connection, "obliquely" is meant to refer to an angle greater than 0° and less than 90°, in particular an angular range of 15 to 80°.

Due to the oblique arrangement of the drive motor, a compact type of construction can be achieved in the height direction, it also being possible to achieve good balance.

It is generally also possible to arrange the drive motor parallel to the longitudinal axis.

It is especially advantageous in the oblique or parallel orientation of the drive motor if the motor shaft is connected to the blade bar via an angular gear unit.

It is advantageous overall if the energy store is arranged on the housing on the whole or entirely in front of the rear handle as viewed in the longitudinal direction.

In this embodiment, very good balance can be achieved even in the case of a comparatively large and comparatively heavy battery.

Furthermore, it is advantageous if the energy store has an energy-store center of gravity, and if the energy store is arranged on the housing in such a way that the energy-store center of gravity is arranged behind the top handle as viewed in the longitudinal direction. The balance can be further improved by this measure.

According to a further preferred embodiment, the energy store is arranged on the housing on the whole behind the top handle as viewed in the longitudinal direction.

In this way, the weight of the energy store with respect to the top handle helps to provide a counterbalance to the blade bar.

It is also advantageous overall if the energy store has an energy-store center of gravity, and if the energy store is arranged on the housing as viewed in the lateral direction in such a way that the energy-store center of gravity is at a distance of not more than 20% of the overall width of the housing from a center-of-gravity longitudinal axis which passes through the hedge-trimmer center of gravity.

This measure ensures that the battery also helps to provide good balance in the lateral direction of the hedge trimmer.

Furthermore, it is advantageous if the energy store is interchangeable, and if the housing has at least one mechanical and/or electrical interface for at least one energy store.

It is certainly also conceivable to integrate an energy store entirely in the housing and to merely provide an interface on the outside on the housing for charging the energy store. However, the interchangeability of the energy store ensures that the hedge trimmer can be operated by means of a plurality of energy stores even for prolonged periods.

It is especially advantageous in this case if the interface on the housing is accessible from above, such that an energy store can be connected to the interface essentially from above.

This means that the battery can easily be inserted and removed.

It is also possible for the interface on the housing to be accessible from the front, in particular obliquely from the front, or from the side, such that an energy store can be connected to the interface essentially from the front, in particular obliquely from the front, or from the side.

This also ensures that the energy store can be easily inserted and removed.

It is especially advantageous here if the housing for accommodating the energy store has a receptacle in which the interface is arranged.

In this case, the energy store forms fewer disturbing contours in the inserted state and can be accommodated at least partly in the receptacle. In addition, the interface can be better protected from environmental load if it is arranged inside the receptacle.

Furthermore, an advantageous embodiment consists in the fact that the top handle is connected to the housing via at least one handle web angled relative to the top handle, the handle web engaging the housing in a region below the hedge-trimmer center of gravity.

Due to this measure, it is also possible to optimally adapt the position of the top handle as viewed in the longitudinal direction to the position of the other components of the hedge trimmer, in particular in order to achieve good balance. Furthermore, this permits easy handling, such that the hedge trimmer can also be taken hold of from the side, that is to say on the handle web.

It is likewise advantageous if a handle axis of the rear handle is oriented within the range of −30° to +30°, in particular −20° to +20°, with respect to the longitudinal axis.

Although it is generally conceivable for the handle axis to be offset laterally from the longitudinal axis, it is preferred if the handle axis is disposed at a fixed angle or is pivotable relative to the longitudinal axis in the height direction within this angular range.

Easy handling can be achieved overall with an arrangement of the handle axis within the angular range.

The rear handle is preferably pivotably mounted on the housing about a pivot axis which is oriented transversely to the longitudinal axis.

In this embodiment, the hedge trimmer can be optimally adapted to the preferred posture of an operator.

The pivot axis in this case preferably runs in the lateral direction.

According to a further preferred embodiment, the rear handle is rotatably mounted on the housing about an axis which is oriented essentially parallel to the longitudinal axis or the associated handle axis.

In this embodiment, an ergonomic position of the hedge trimmer can also be achieved when guiding the hedge trimmer in a vertical plane. Fatigue-free work is generally possible. The axis of rotation may be oriented parallel to the longitudinal axis. However, the axis of rotation may also be angled relative to the longitudinal axis within the range of up to about ±20°.

Rotatability can be possible, for example, from −90° to +90° relative to the height direction. However, a greater or a more restricted angular range with respect to this rotatability is also conceivable.

In addition, rotatability or a pivoting capacity of the rear handle can be achieved in a simple manner in terms of design if the energy store is arranged on the whole in front of the rear handle.

It is also preferred overall if the drive motor and the energy store are arranged on the housing in such a way that the hedge trimmer, if it is freely held at the top handle, assumes a position of equilibrium in which the longitudinal axis encloses an equilibrium angle α within the range of $-30° \leq \alpha \leq +30°$ with the horizontal.

This avoids a situation in which the blade bar swings upwards or downwards if a person lets go of the rear handle and the hedge trimmer is consequently only held at the top handle. This could even lead to a safety risk if the blade bar is still running on after letting go of the rear handle.

It should be noted here that the hedge trimmer according to the invention preferably has an actuating means on both the top and the rear handle, the hedge trimmer only being put into operation when both actuating means are actuated.

Preferably, the center of gravity of the energy store is arranged above the blade bar.

This allows a bottom side of the housing to be arranged flush with the blade bar so that the housing and the energy store, respectively, do not form a disturbing contour for the regular operation of the hedge trimmer.

It goes without saying that the abovementioned features and the features still to be explained below can be used not only in the respectively specified combination but also in other combinations or on their own without departing from the scope of the present invention.

BRIEF DESCRIPTION OF DRAWINGS

Exemplary embodiments of the invention are shown in the drawing and described in more detail below. In the drawings.

DETAILED DESCRIPTION

Figure 1:
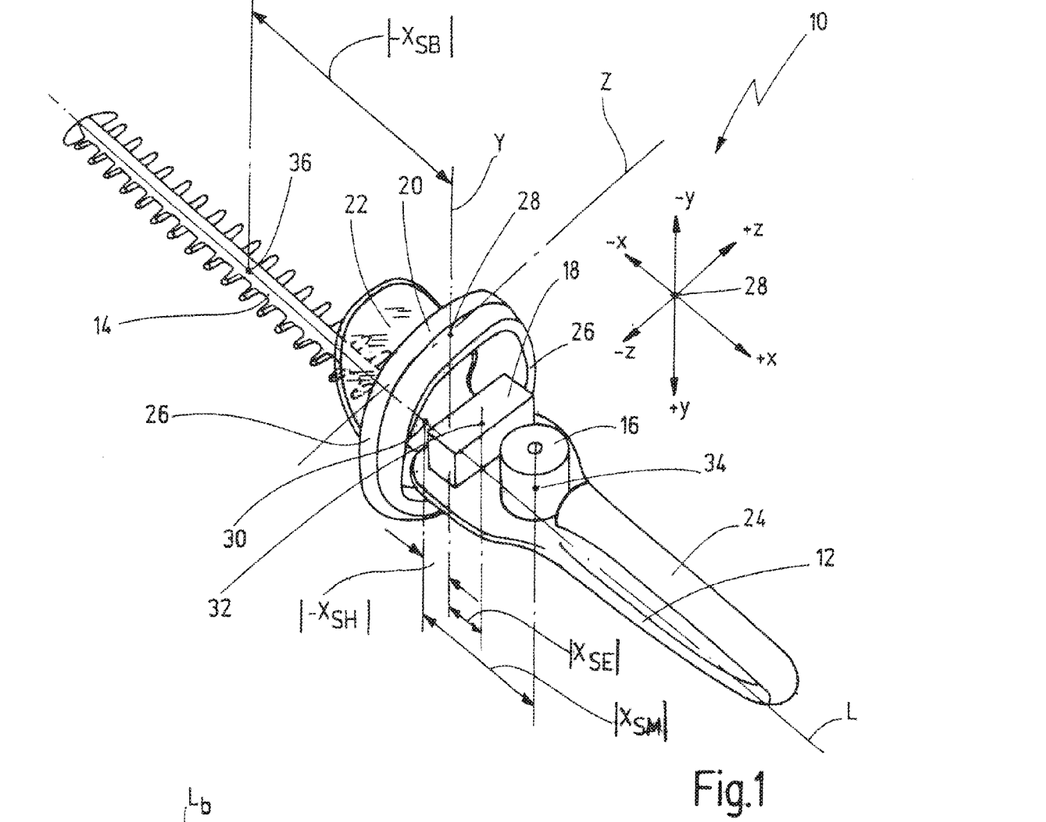
FIG. 1 shows a perspective view, partly cut away at the housing, of an embodiment of a hedge trimmer according to the invention obliquely from the rear.

A first embodiment of a hedge trimmer according to the invention is designated overall by 10 in FIG. 1.

The hedge trimmer 10 has a housing 12 extending generally along a longitudinal axis L. Mounted on or to the housing 12 is a blade bar 14, which extends along the longitudinal axis L. Furthermore, an electric drive motor 16 and an electric energy store 18 in the form of a rechargeable battery are arranged on or in the housing 12.

The energy store 18 has cells with a high energy density of, for example, at least 100 Wh/kg. The energy store 18 may be designed on a lithium basis, for example as a lithium ion battery, lithium polymer battery, etc., or on another or comparable basis. Furthermore, it goes without saying that the energy store may consist of a plurality of cells, the individual voltages of which add up on account of a series connection. A parallel connection of such individual cells is also possible. Furthermore, the energy store 18 preferably contains an internal protective circuit which disconnects the energy store, for example before a low charge or overcharge. Charging electronics may also be contained in the protective circuit.

Furthermore, a top handle 20 and a protective shield 22 are fixed to the housing 12. The protective shield 22 is arranged obliquely in front of the top handle 20 and serves to protect the hand holding the top handle 20 from branches or the like.

Furthermore, a rear handle is provided on the housing 12. The rear handle is oriented approximately parallel to the longitudinal axis L, whereas the top handle 20 is oriented transversely thereto. The top handle 20 is connected to the housing 12 via a left-hand and a right-hand lateral gripping web 26, to be precise in the region of the bottom ends of the gripping webs 26.

Serving to explain the relative position of the above-described elements is a coordinate system which is depicted in FIG. 1 and is used below as follows. In the coordinate system, an x axis is oriented generally parallel to the longitudinal axis L. A y axis is oriented at right angles to the x axis in the height direction and thus extends vertically in the horizontal arrangement of the x axis. The z axis is oriented in the lateral direction and thus extends to the left and right with respect to the x axis. Furthermore, it is assumed that the blade bar 14 is arranged at the front and the rear handle 24 is arranged at the rear, this only being a definition and not being intended to be seen restrictively.

In the present exemplary embodiment, the origin of the above-described coordinate system is placed at a suspension point 28 on the top handle 20. Positive x values extend rearwards starting from here. Positive y values extend downwards starting from here.

Figure 2:
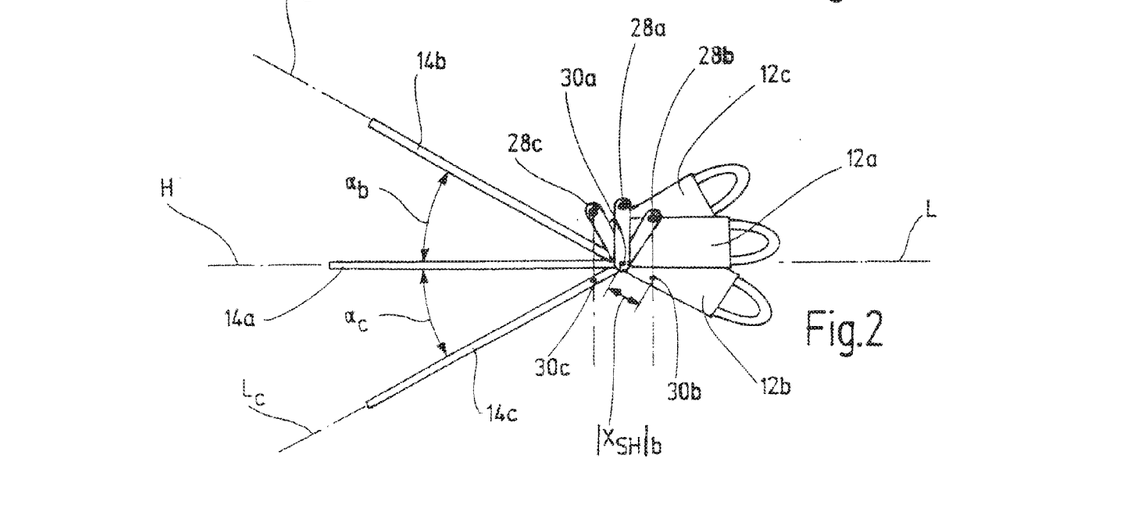
FIG. 2 shows a schematic side view of hedge trimmers according to the invention in different positions of equilibrium.

The hedge trimmer 10 of FIG. 1 has an overall center of gravity which is designated by 30 in FIG. 1. In the case shown, the center of gravity 30 lies in front of the origin 28 of the coordinate system at $-x_{SH}$. This means that the hedge trimmer 10, when it is freely held at the top handle, tilts slightly downwards with the blade bar 14. In the position of equilibrium, the center of gravity 30 then lies below the suspension point 28 (=origin of coordinate system) of the top handle 20. This is shown in FIG. 2 for three different designs of the hedge trimmer 10. If the center of gravity 30a lies directly below the suspension point 28a when the hedge trimmer 10 is oriented horizontally, a horizontal position of equilibrium is obtained. If the center of gravity 30b lies behind the suspension point 28b, a position of equilibrium pointing obliquely upwards is obtained, an equilibrium angle $\alpha_b$ being set between the longitudinal axis $L_b$ and the horizontal H. If the center of gravity 30c lies in front of the suspension point 28c, a position of equilibrium is obtained in which the blade bar 14c is inclined downwards and assumes an equilibrium angle $\alpha_c$ with the horizontal H.

Again referring to FIG. 1, the electric drive motor 16 and the electric energy store 18 are arranged on the housing 12 in such a way that the hedge trimmer, if it is held at the suspension point 28, assumes a position of equilibrium in which the equilibrium angle α is within the range of −30°≤α≤+30°. The respective limit angles are shown in FIG. 2.

The electric energy store has a center of gravity 32. The electric drive motor 16 has a center of gravity 34, and the blade bar 14 has a center of gravity 36.

The following indication of relative positions of the individual elements is intended to relate generally to the position of the respective center of gravity, unless indicated otherwise.

In the hedge trimmer 10 of FIG. 1, a stable position of equilibrium is achieved by the energy store 18 being arranged in front of the drive motor 16, that is to say $x_{SE} < x_{SM}$, where SE relates to the center of gravity of the energy store and SM relates to the center of gravity of the motor.

Furthermore, it can be seen in the illustration of FIG. 1 that the center of gravity 30 lies in front of the suspension point 28, since $x_{SH}$ (SH stands for center of gravity of hedge trimmer) lies within the negative x range.

Both the drive motor 16 and the energy store 18 lie in front of the rear handle 24. Furthermore, in the embodiment in FIG. 1, the energy store 18 and the drive motor 16 lie behind the suspension point 28. The center of gravity 32 of the energy store 18 lies above the blade bar 14. To be exact, the energy storage 18 lies completely above the blade bar 14 (with reference to a horizontal attitude of the edge trimmer.

Further embodiments of hedge trimmers according to the invention are described below, the general construction and general functioning of which correspond to the hedge trimmer 10 of FIG. 1. The same elements or elements corresponding to one another are therefore provided with the same reference numerals. Furthermore, the above description is intended to be generally applicable in the same manner to the following embodiments, and therefore only the differences are dealt with below.

Figure 3:
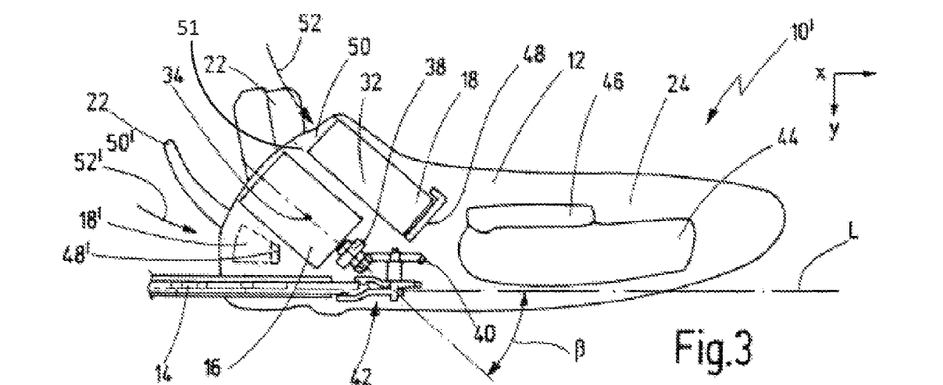
FIG. 3 shows a schematic side view of a further embodiment of a hedge trimmer according to the invention.

An alternative embodiment of a hedge trimmer according to the invention is designated overall by 10' in FIG. 3. The hedge trimmer 10' is designed such that the housing 12 is of generally flat construction in the height direction y.

In this case, provision is made for the drive motor 16 to be oriented obliquely to the longitudinal axis L. To be more precise, the drive motor 16 has a motor shaft 38 which encloses a motor shaft angle β with the longitudinal axis L. The angle β generally lies within the range of 0°<β<90°, preferably within the range of 5°≤β≤80°, and in particular within a range 0°<β≤50°.

One end of the motor shaft 38 is coupled to an angular gear unit 40, which is connected to an eccentric drive 42 for driving the blade bar 14.

The inclination of the electric drive motor 16 means that the housing 12 can be of smaller construction in the height direction y.

It is also shown in FIG. 3 that the housing 12 has an opening 44 in a rear region, the rear handle 24 being formed above the opening 44. A hand grasping the rear handle 24 consequently reaches into the housing opening 44. An operating means in the form of a switch 46 is arranged on the inner circumference of the housing 44.

Furthermore, the housing 12 has a receptacle 50 for an energy store 18, an electrical interface 48 for the electrical connection of the energy store 18 to control electronics (not shown) arranged in the housing 12 being provided at the base of the receptacle 50.

The interface 48 may also contain mechanical interface components, such as latching components for example.

The receptacle 50 is in this case provided on the housing in such a way that the energy store 18 is oriented obliquely to the longitudinal axis L and is arranged obliquely above the drive motor 16. In other words, the center of gravity 32 of the energy store 18 is arranged behind but higher than the center of gravity 36 of the drive motor 16. In projection, the housings of drive motor 16 and energy store 18 overlap in both the height direction y and the longitudinal direction x.

In a top region of the housing 12, the receptacle 50 has an opening via which the energy store 18 can be inserted. The insertion direction is shown at 52.

Also shown in FIG. 3 is an energy store 18' which is arranged obliquely below the drive motor 16. The energy store 18' may be provided as an alternative to or in addition to the energy store 18. A corresponding receptacle 50', with an interface 48', may be advantageously provided for the energy store 18'. In this case, the interface 48' is accessible from the front, as shown by an arrow 52'.

Figure 4:
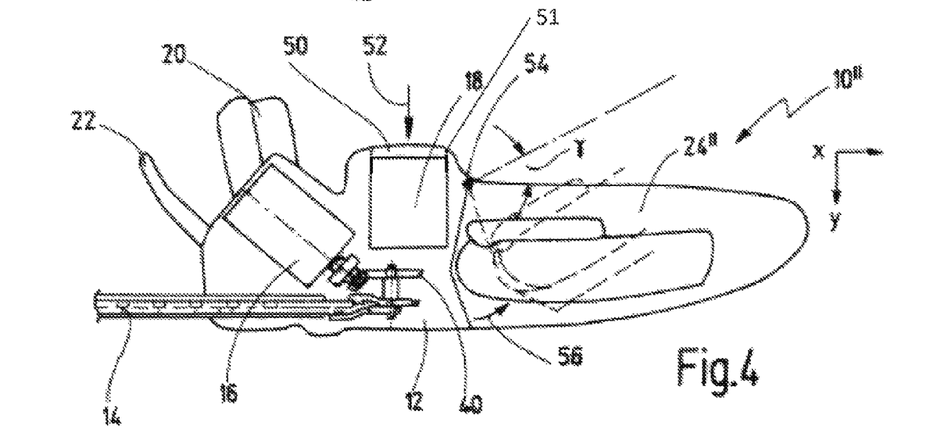
FIG. 4 shows a schematic side view of a further embodiment of a hedge trimmer according to the invention.

A further alternative embodiment of a hedge trimmer according to the invention is designated overall by 10" in FIG. 4.

In the hedge trimmer 10", the drive motor 16 is likewise arranged obliquely, as in the hedge trimmer 10' of FIG. 3. The battery 18, however, is arranged completely behind the drive motor 16 and is oriented, for example, in the height direction y. In a corresponding manner, the receptacle 50 is oriented in the height direction y and an energy store 18 is inserted into the receptacle 50 in the height direction y (arrow 52).

Apart from that, the construction of the hedge trimmer 10" corresponds to that of the hedge trimmer 10'.

In addition to this, however, provision is made for the rear handle 24" to be pivoted (disposed at a fixed angle) or to be pivotable relative to the housing 12, to be precise about a pivot axis 54 which is oriented in the lateral direction z. The pivoting direction is shown at 56. The pivot angle is designated by γ.

In general it is possible to pivot the rear handle 24 within a range of −30°≤γ≤30°, in particular from −20° to +20° or from 0° to +30°, to be precise with regard to the longitudinal direction x.

Figure 5:
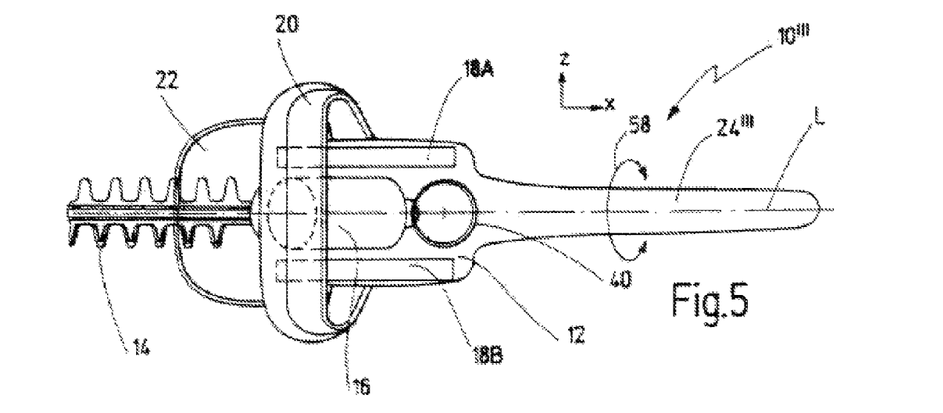
FIG. 5 shows a schematic plan view of a further embodiment of a hedge trimmer according to the invention.

A further alternative embodiment of a hedge trimmer according to the invention is designated overall by 10''' in FIG. 5.

In the hedge trimmer 10''', the drive motor 16 is arranged as in the hedge trimmers 10' and 10". However, the energy store in the hedge trimmer 10''' has two sections 18A, 18B which are arranged in the lateral direction z on opposite sides of the drive motor 16. Here, the energy store sections 18A, 18B are preferably arranged symmetrically with respect to the drive motor 16. The energy store sections 18A, 18B may be part of a single energy store, which has a U shape for example. In this case, the U legs would form the energy store sections 18A, 18B.

However, it is also possible for the energy store sections 18A, 18B to each be formed by a separate energy store (for example in the form of a respective battery with separate protective circuit).

In FIG. 5, it is shown at 58 that it is possible for the rear handle 24''' to be mounted on the housing 12 in a rotatable manner about an axis which is oriented parallel to the longitudinal axis L or the handle axis of the rear handle (which is possibly pivoted).

In this case, either the entire rear handle 24''' may be rotatable about the axis, or only the section of the rear handle 24''' which is actually grasped by the hand may be rotatable.

Due to the rotatability of the rear handle 24''', in particular work overhead or in a perpendicular orientation of the hedge trimmer is simplified.

It should generally be noted that a large degree of freedom with regard to the configuration and construction of the rear handle 24 is possible due to the arrangement of the energy store 18 in front of the rear handle 24. This applies to both the rotatability and the possible pivoting capacity of the rear handle 24.

Figure 6:
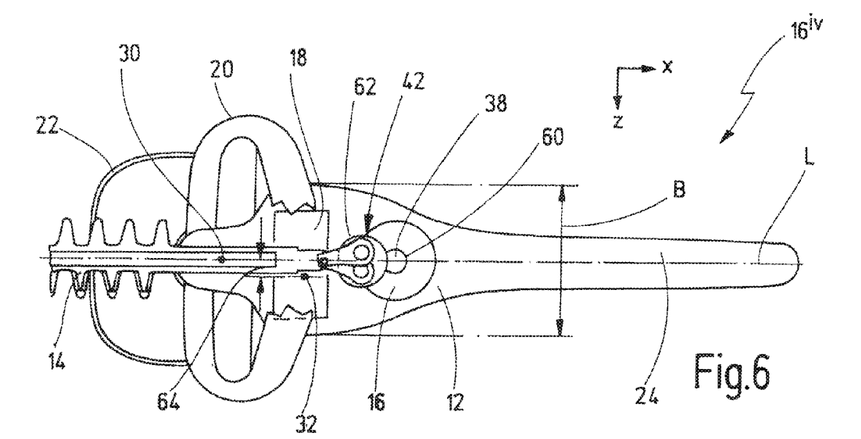
FIG. 6 shows a schematic view of a further embodiment of a hedge trimmer according to the invention from below.

A further alternative embodiment of a hedge trimmer according to the invention is designated overall by $10^{IV}$ in FIG. 6.

In FIG. 6, the eccentric drive 42 for driving the blade bar 14 is shown in greater detail. It can be seen that the eccentric drive has a gear 62, which is driven by a pinion 60. The pinion 60 may be fixed, for example, to the motor shaft 38 of the drive motor 16. However, the pinion 60 may also be part of the angular gear unit 40, as shown in FIGS. 3 and 4.

A reduction ratio can be set by the combination of the pinion 60 and the gear 62, such that the drive motor 16 can be operated at relatively high speed. In this way, the drive motor 16 can be of compact design overall.

Also shown in FIG. 6 is an energy store 18, which is arranged in front of the drive motor 16 as viewed in the longitudinal direction x.

Also shown in FIG. 6 is the center of gravity 32 of the energy store 18. The center of gravity 32 is at a lateral distance 64 from the longitudinal axis L of the hedge trimmer $10^{IV}$, the longitudinal axis L passing through the center of gravity 30 of the hedge trimmer $10^{IV}$.

The value of the distance 64 is less than 20% of the overall width B of the housing 12 of the hedge trimmer $10^{IV}$, such that good balance can also be achieved in the lateral direction.

Figure 7:
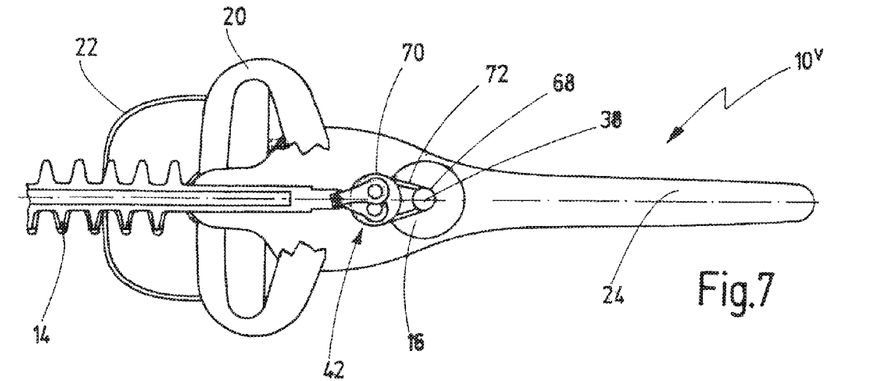
FIG. 7 shows a schematic view of a further embodiment of a hedge trimmer according to the invention from below.

A further alternative embodiment of a hedge trimmer according to the invention is designated overall by $10^{V}$ in FIG. 7.

The hedge trimmer $10^{V}$ corresponds to the hedge trimmer $10^{IV}$ in FIG. 6, a belt drive being provided instead of the pinion 60 and the gear 62, which belt drive has a first belt pulley 68 which is coupled to the motor shaft 38 of the drive motor 16. Furthermore, the belt drive has a second belt pulley 70 which is coupled to the eccentric drive 42. A corresponding belt is shown at 72. A reduction ratio can also be achieved with the belt drive 68, 70, 72. It goes without saying that the first belt pulley 68 can also be connected to the angular gear unit 40 instead of the motor shaft 38.

Figure 8:
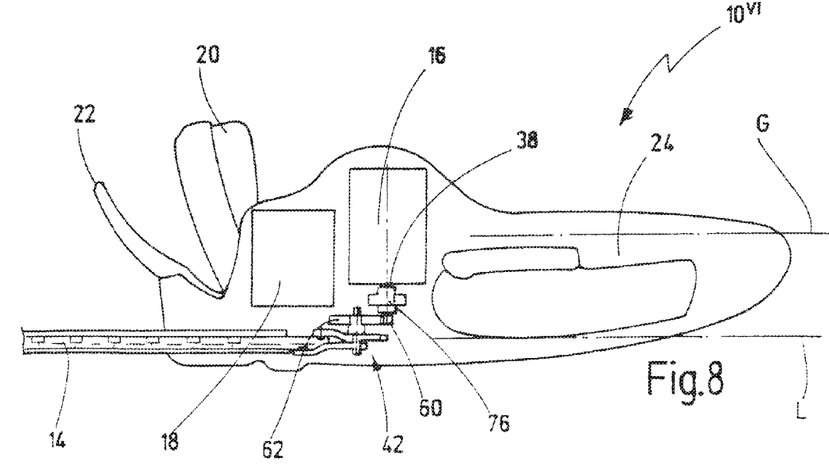
FIG. 8 shows a schematic side view of a further embodiment of a hedge trimmer according to the invention.

A further alternative embodiment of a hedge trimmer according to the invention is designated overall by $10^{VI}$ in FIG. 8.

It is shown in FIG. 8 that the motor shaft 38 of the electric drive motor 16 is not directly connected to the pinion 60. Rather, in the case of the hedge trimmer $10^{VI}$, a slip clutch 76 is arranged between the motor shaft 38 and the pinion 60 (or the first belt pulley 68). The slip clutch 76 serves to avoid an excessive motor current if the blade bar 14 is suddenly obstructed, for example when engaging on a branch that is too thick or on a woody branch.

In the hedge trimmer $10^{VI}$, the energy store 18 is arranged in front of the drive motor 16, as in the hedge trimmer 10 of FIG. 1.

Furthermore, it is shown in FIG. 8 that the rear handle 24 is oriented in a handle axis G. The handle axis G runs approximately parallel to the longitudinal axis L or at an acute angle to it, the handle axis G and the longitudinal axis L enclosing a handle angle (comparable to the handle angle γ in FIG. 4), which can be within the range of $-30° \leq \gamma \leq 30°$. In the embodiment shown, the angle γ is markedly smaller than 5°.

It goes without saying that the various modifications which are shown in the different embodiments of hedge trimmers in FIGS. 3 to 8 can be used in any desired combination. The illustration of individual features with regard to one of the embodiments is in no way intended to have a restrictive effect with regard to the other embodiments. The other embodiments may also each be provided with the features shown in only one other embodiment.

What is claimed is:

1. An outdoor power tool comprising:
    a main housing having an upper side and a lower side, the upper and lower side being defined when the tool is in a horizontal orientation with a longitudinal axis of the blade bar substantially parallel to the ground;
    a blade bar projecting forward from the housing along the longitudinal axis;
    an electric drive motor for driving the blade bar arranged within the housing;
    at least one battery for supplying the drive motor with electrical energy arranged mainly within an outer contour of the housing; and
    a top handle arranged above a center of gravity of the outdoor power tool when the tool is in a horizontal orientation with the longitudinal axis of the blade bar substantially parallel to the ground, and
    a rear handle formed integrally with the housing and arranged behind the outdoor power tool center of gravity and the top handle when the tool is in a horizontal orientation with the longitudinal axis of the blade bar substantially parallel to the ground, the battery being arranged on the housing at least mainly in front of the rear handle, the housing having a receptacle for interchangeably accommodating the battery, wherein the receptacle has an interface for the battery that is generally accessible from the upper side of the housing, such that the battery can be inserted into an opening of the receptacle at the upper side of the housing and connected to the interface with the battery received at least partly within the receptacle,
    wherein, when the tool is in the horizontal orientation, the lower side of the main housing generally defines a lower plane and the blade bar projects forward from the housing entirely above the lower plane.

2. The outdoor power tool according to claim 1, wherein the battery is arranged on the housing in front of the drive motor as viewed in the longitudinal direction.

3. The outdoor power tool according to claim 1, wherein the battery is arranged on the housing in an overlapping manner with the drive motor as viewed in the height direction.

4. The outdoor power tool according to claim 3, wherein the battery is arranged on the housing at least partly above the drive motor.

5. The outdoor power tool according to claim 3, wherein the battery is arranged on the housing at least partly below the drive motor.

6. The outdoor power tool according to claim 1, wherein the battery is arranged on the housing at least partly in an overlapping manner with the drive motor as viewed in the lateral direction.

7. The outdoor power tool according to claim 6, wherein the battery is arranged on the housing laterally next to the drive motor.

8. The outdoor power tool according to claim 1, wherein the battery is arranged on the housing behind the drive motor as viewed in the longitudinal direction.

9. The outdoor power tool according to claim 1, wherein the battery has two sections which are arranged approximately symmetrically with respect to the drive motor.

10. The outdoor power tool according to claim 1, wherein the battery is arranged on the housing obliquely with respect to the longitudinal axis.

11. The outdoor power tool according to claim 1, wherein the drive motor has a motor shaft which is arranged obliquely with respect to the longitudinal axis.

12. The outdoor power tool according to claim 11, wherein the motor shaft is connected to the blade bar via an angular gear unit.

13. The outdoor power tool according to claim 1, wherein the battery is arranged on the housing on the whole in front of the rear handle as viewed in the longitudinal direction.

14. The outdoor power tool according to claim 1, wherein the battery has a battery center of gravity, and wherein the battery is arranged on the housing in such a way that the battery center of gravity is arranged behind the top handle as viewed in the longitudinal direction.

15. The outdoor power tool according to claim 1, wherein the battery is arranged on the housing on the whole behind the top handle as viewed in the longitudinal direction.

16. The outdoor power tool according to claim 1, wherein the interface comprises at least one of a mechanical and an electrical interface.

17. The outdoor power tool according to claim 16, wherein the interface on the housing is accessible from the front, in particular obliquely from the front, such that a battery is connected to the interface essentially from the front.

18. The outdoor power tool according to claim 16, wherein the interface on the housing is accessible obliquely from the front.

19. The outdoor power tool according to claim 16, wherein the interface on the housing is accessible from a side, such that a battery is connected to the interface essentially from the side.

20. The outdoor power tool according to claim 1, wherein the top handle is connected to the housing via at least one handle web angled relative to the top handle, the handle web engaging the housing in a region below the outdoor power tool center of gravity.

21. The outdoor power tool according to claim 1, wherein a handle axis of the rear handle is oriented within the range of −30° to +30° with respect to the longitudinal axis.

22. The outdoor power tool according to claim 1, wherein the center of gravity of the battery is arranged above the blade bar.

23. The outdoor power tool according to claim 22, wherein the battery is arranged completely above the blade bar.

24. The outdoor power tool according to claim 1, wherein the rear handle is directly coupled to the housing.

25. The outdoor power tool according to claim 1, wherein the rear handle is rigidly coupled to the housing.

26. The outdoor power tool according to claim 1, wherein the rear handle is formed by the housing.

27. The outdoor power tool according to claim 1, wherein the battery is received entirely within the receptacle.

28. An outdoor power tool comprising:
a main housing having an upper side and a lower side, the upper and lower side being defined when the tool is in a horizontal orientation with a longitudinal axis of the blade bar substantially parallel to the ground;
a blade bar positionable to project forward from the housing along the longitudinal axis;
an electric drive motor for driving the blade bar, arranged within the housing;
at least one battery for supplying the drive motor with electrical energy, arranged mainly within an outer contour of the housing;
a top handle coupled to the housing; and
a rear handle formed integrally with the housing and arranged behind the top handle and an outdoor power tool center of gravity when the tool is in a horizontal orientation with the longitudinal axis of the blade bar substantially parallel to the ground, the battery being arranged on the housing in front of the rear handle, and the center of gravity of the battery being arranged generally above the longitudinal axis of the blade bar when the tool is in a horizontal orientation with the blade bar substantially parallel to the ground, and the housing having a receptacle for interchangeably accommodating the battery, wherein the receptacle has an interface for the battery that is generally accessible from the upper side of the housing, such that the battery can be inserted into an opening of the receptacle at the upper side of the housing and connected to the interface with the battery received at least partly within the receptacle,
wherein, when the tool is in the horizontal orientation, the lower side of the main housing generally defines a lower plane and the blade bar projects forward from the housing entirely above the lower plane.

29. The outdoor power tool according to claim 28, wherein the battery is arranged on the housing in front of the drive motor as viewed in the longitudinal direction.

30. The outdoor power tool according to claim 28, wherein the battery is arranged on the housing behind the drive motor as viewed in the longitudinal direction.

31. The outdoor power tool according to claim 28, wherein the battery has a battery center of gravity, and wherein the battery is arranged on the housing in such a way that the battery center of gravity is arranged behind the top handle as viewed in the longitudinal direction.

32. The outdoor power tool according to claim 28, wherein the interface comprises at least one of a mechanical and at least one of an electrical interface for the at least one battery.

33. The outdoor power tool according to claim 32, wherein the interface on the housing is accessible from the side, such that a battery is connected to the interface essentially from the side.

* * * * *